United States Patent
Lin

(10) Patent No.: US 12,532,869 B2
(45) Date of Patent: Jan. 27, 2026

(54) PET HEALTH MANAGEMENT SYSTEM

(71) Applicant: HARMONATION INC., New Taipei (TW)

(72) Inventor: Ching-Ting Lin, New Taipei (TW)

(73) Assignee: HARMONATION INC., New Taipei (TW)

( * ) Notice: Subject to any disclaimer, the term of this patent is extended or adjusted under 35 U.S.C. 154(b) by 41 days.

(21) Appl. No.: 18/600,213

(22) Filed: Mar. 8, 2024

(65) Prior Publication Data

US 2024/0298613 A1    Sep. 12, 2024

(30) Foreign Application Priority Data

Mar. 10, 2023  (TW) ................................ 112108814

(51) Int. Cl.
*A61D 17/00*    (2006.01)
*A01K 27/00*    (2006.01)
(Continued)

(52) U.S. Cl.
CPC .......... *A01K 29/005* (2013.01); *A01K 27/009* (2013.01); *A61B 5/0022* (2013.01);
(Continued)

(58) Field of Classification Search
CPC ............ A61B 5/02055; A61B 2503/40; A61B 2560/0252; A61B 2562/0219; A61B 5/0008; A61B 5/0022; A61B 5/01; A61B 5/02438; A61B 5/0507; A61B 5/0533; A61B 5/1118; A61B 5/14551; A61B 5/257; A61B 5/332; A61B 5/369; A61B 5/389; A61B 5/398; A61B 5/4809; A61B 5/4812; A61B 5/4815; A61B 5/4818; A61B 5/4857; A61B 5/681; A61B 5/6814; A61B 1/00; A61B 3/00; A61B 5/00; A61B 6/00; A61B 7/00; A61B 8/00; A61B 9/00; A61B 10/00; A61B 13/00; A61B 16/00; A61B 17/00; A61B 18/00; A61B 34/00; A61B 42/00; A61B 46/00; A61B 50/00; A61B 90/00; A61B 2217/00; A61B 2218/00;
(Continued)

(56) References Cited

U.S. PATENT DOCUMENTS 10,091,972 B1 *  10/2018  Jensen ..................... A01K 7/02
2009/0055192 A1 *  2/2009  Liebermann ............ G10L 13/00
                                                     704/271

(Continued)

*Primary Examiner* — Daniel Previl
(74) *Attorney, Agent, or Firm* — MUNCY, GEISSLER, OLDS & LOWE, P.C.

(57) ABSTRACT

A pet health management system comprising: a wearable sensing device, a mobile carrier, and a remote server. The wearable sensing device acquires environmental and physiological information of a pet and transmits the information to the mobile carrier. The wearable sensing device includes a microwave receiver for acquiring the physiological information. The remote server stores owner information and pet physiological information, receives the physiological and environmental information from the mobile carrier, updates the pet physiological information based on the physiological and environmental information, and generates and returns a pet status to the mobile carrier.

8 Claims, 2 Drawing Sheets

(51) Int. Cl.
  *A01K 29/00* (2006.01)
  *A61B 5/00* (2006.01)
  *A61B 5/0205* (2006.01)
  *A61B 5/0507* (2021.01)

(52) U.S. Cl.
  CPC ........ *A61B 5/02055* (2013.01); *A61B 5/0507* (2013.01); *A61B 2503/40* (2013.01)

(58) Field of Classification Search
  CPC ............ A61B 2503/00; A61B 2505/00; A61B 2560/00; A61B 2562/00; A61B 2576/00; A01K 27/009; A01K 29/005; A01K 1/00; A01K 3/00; A01K 5/00; A01K 7/00; A01K 9/00; A01K 13/00; A01K 11/00; A01K 14/00; A01K 15/00; A01K 17/00; A01K 19/00; A01K 21/00; A01K 23/00; A01K 25/00; A01K 27/00; A01K 29/00; A01K 31/00; A01K 33/00; A01K 35/00; A01K 37/00; A01K 39/00; A01K 41/00; A01K 43/00; A01K 45/00; A01K 47/00; A01K 49/00; A01K 51/00; A01K 53/00; A01K 55/00; A01K 57/00; A01K 59/00; A01K 61/00; A01K 63/00; A01K 65/00; A01K 67/00; A01K 69/00; A01K 71/00; A01K 73/00; A01K 74/00; A01K 75/00; A01K 77/00; A01K 79/00; A01K 80/00; A01K 81/00; A01K 83/00; A01K 85/00; A01K 87/00; A01K 89/00; A01K 91/00; A01K 93/00; A01K 95/00; A01K 97/00; A01K 99/00; A01K 2207/00; A01K 2217/00; A01K 2227/00; A01K 2267/00; G16H 10/20; G16H 40/20; G16H 70/00; G16H 10/00; G16H 15/00; G16H 20/00; G16H 30/00; G16H 40/00; G16H 50/00; G16H 80/00
  USPC .... 340/573.3, 571, 572.1–572.9, 573.1, 575, 340/588, 601–602, 604, 614, 636.11, 666, 340/3.1, 5.52, 10.42
  See application file for complete search history.

(56) References Cited

U.S. PATENT DOCUMENTS

| | | | | |
|---|---|---|---|---|
| 2016/0135431 | A1* | 5/2016 | Sheldon | A01K 27/009 |
| | | | | 119/859 |
| 2016/0366854 | A1* | 12/2016 | Mainini | A01K 11/008 |
| 2016/0366858 | A1* | 12/2016 | Seltzer | A01K 29/005 |
| 2019/0029222 | A1* | 1/2019 | Anderton | A01K 5/0233 |
| 2019/0192053 | A1* | 6/2019 | Saigh | G16H 20/30 |

* cited by examiner

PET HEALTH MANAGEMENT SYSTEM

FIELD OF INVENTION

The present disclosure relates to a pet health management system that integrates owner information and hospital information via pet physiological information to reduce information asymmetry between them.

BACKGROUND OF THE INVENTION

As pets have become an integral part of many households, the pet care sector has emerged as a significant market. The use of modern monitoring technology and cloud computing enables the provision of extensive physiological information on pets, which serves as the basis for caring for pets and maintaining their overall physical and mental well-being.

SUMMARY OF THE INVENTION

The present disclosure provides a pet health management system comprising: a wearable sensing device, a mobile carrier, and a remote server. The wearable sensing device is used to acquire environmental information and physiological information of a pet and to transmit the physiological information and the environmental information to the mobile carrier, and the wearable sensing device includes a microwave receiver for acquiring the physiological information. The remote server stores owner information and pet physiological information, receives the physiological information and the environmental information transmitted from the mobile carrier, updates the pet physiological information based on the environmental information and the physiological information, and generates and returns a pet status to the mobile carrier.

Furthermore, the wearable sensing device is wirelessly connected to a transmission device that transmits the physiological information and the environmental information acquired by the wearable sensing device to the mobile carrier or another server.

Furthermore, the physiological information corresponds to at least one of heartbeat, respiration, steps, and blood oxygen, and the environmental information includes temperature and/or humidity.

Furthermore, the mobile carrier is used to input care information, and the remote server or the mobile carrier generates care reminder information based on the care information.

Furthermore, the pet physiological information includes pathological information.

Furthermore, the remote server generates pet social information based on the owner information and/or the pet physiological information.

Furthermore, the remote server forms the pet status based on the physiological information and a location coordinate of the wearable sensing device.

Furthermore, the number of the transmission devices is plural and have different coordinates.

Furthermore, the pet status corresponds to one of multiple levels, and the remote server is configured to reset the level corresponding to the pet status to match a care context and return the level to the mobile carrier.

Furthermore, a resetting being executed by the remote server is such that the pet status corresponding to first level physiological information in one care context and the same pet status corresponding to second level physiological information in another care context are the same, and the resetting is performed based on a medical order.

DETAILED DESCRIPTION OF THE PREFERRED EMBODIMENTS

Figure 1:
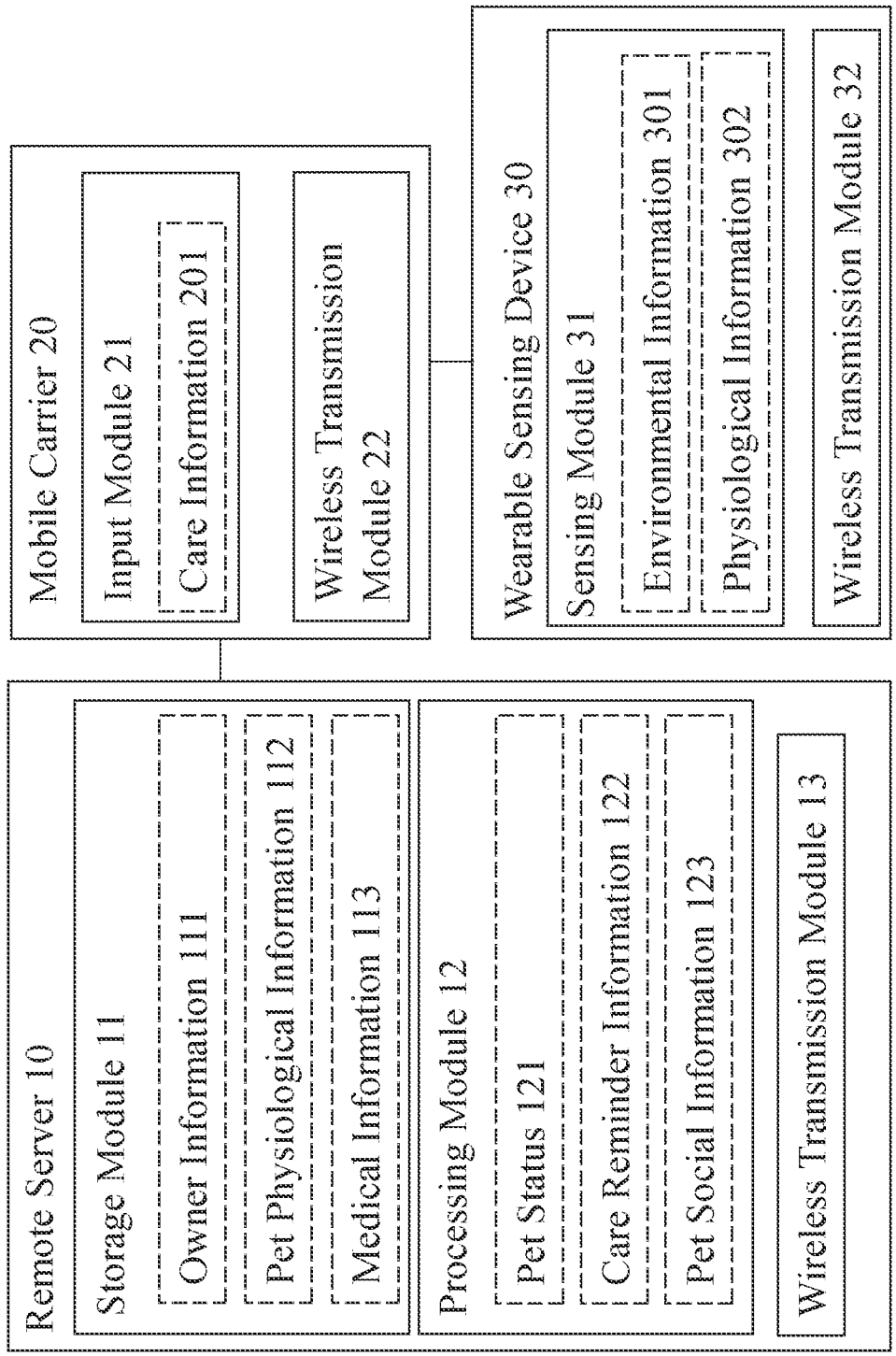
FIG. 1 is a schematic diagram of the pet health management system.

Reference is made to FIG. 1, which illustrates a schematic of a pet health management system comprising a wearable sensing device 30, a mobile carrier 20, and a remote server 10. The wearable sensing device 30 is worn on a pet and is wirelessly connected to the mobile carrier 20. The wireless transmission module 22 of the mobile carrier 20 receives environmental information 301 and physiological information 302 acquired by the wearable sensing device 30, and wirelessly transmits this information to the remote server 10.

The wearable sensing device 30 includes at least a sensing module 31 and a wireless transmission module 32. The wireless transmission module 32 may be a Bluetooth and/or wireless network module, while the sensing module 31 may include a microwave receiver. By utilizing the characteristic of short-pulse, low-power microwave signals that are not attenuated over long distances, so that the wearable sensing device 30 can acquire the physiological information 302 of the pet without having to contact the skin of the pet or requiring the pet to be shaved. The obtained physiological information 302 may include, for example, one or more of heartbeat, respiration, steps, and blood oxygen information. The sensing module 31 can directly collect the physiological information or convert raw data through algorithms into the corresponding physiological information 302, such as a heart rate, a blood oxygen level, a respiration rate, a step count, or a head movement frequency. It is also noteworthy that combining the multiple physiological information 302 to derive reference data, such as emotional information converted from the respiration rate or the heart rate, and the step count corresponding to activity information of the pet, should both fall within the scope of the physiological information 302.

As the wearable sensing device 30 will be worn on the pet for an extended period of time, the sensing module 31 of the wearable sensing device 30 may also include environmental sensing functionality to acquire temperature and/or humidity data around the pet. In the event that the pet requires long-term care, this data may assist the healthcare professional or owner in monitoring and assessing the recovery status of the pet.

The remote server 10 includes a storage module 11, a processing module 12, and a wireless transmission module 13 that is wirelessly connected to the mobile carrier 20. The storage module 11 is used to store owner information 111, pet physiological information 112, and medical information 113.

The owner information 111 may include an owner identity, an owner location, a pet breed, a pet age, etc., which may be obtained from the mobile carrier 20 (e.g., a smartphone). The mobile carrier 20 includes a built-in input module 21 for allowing owners to input care information 201, such as a pet weight, medication dosing periods (for deworming), checkup times, vaccination schedules, a bath, a grooming, a massage, a urination, or default time frequencies for performing the aforementioned care behaviors, among others. The remote server 10 or the mobile carrier 20 may generate care reminder information 122 based on said care information to remind owners to perform specific care behaviors at specific times.

The pet physiological information 112 corresponds to the environmental information 301 and the physiological information 302 acquired by the wearable sensing device 30. The remote server 10 updates the pet physiological information 112 after receiving the environmental information 301 and the physiological information 302, and generates a pet status 121 and returns it to the mobile carrier 20. Therefore, the pet status 121 that integrates the environmental information 301 and the physiological information 302 can be categorized into multiple levels according to different contexts. For example, in a care context, the multiple levels can be set to a normal (or average) value as healthy, 20% above normal as caution, and 40% above normal as requiring special attention, allowing the owner to acknowledge the pet's condition. Similarly, in a monitoring context, such as walking, at home, or resting, each monitoring context can correspond to multiple care levels, such as health, caution, and special attention, as mentioned earlier.

When the pet status 121 requires special attention, the remote server 10 can send the pet status 121 to multiple mobile carriers 20 according to the owner information 111 settings to alert more people. In addition, the mobile carrier 20 can also sort the pet physiological information 112 or the pet status 121 according to time (daily, weekly, or monthly) to allow the owner to be aware of the long-term changes in the pet's physiology.

The medical information 113 is referred to the information of the veterinary hospital locations, contact channels, medical departments, business hours, other owner evaluations, and so on. When scheduling a regular checkup for the pet in the care reminder information 122, the owner can make an appointment at the specific veterinary hospital via the mobile carrier 20. The mobile carrier or the computer held by a veterinarian can be set to connect to the remote server 10 via applications, import the pet physiological information 112 for reference, and conduct online medical consultations. After the online medical consultations, the owner can update the pet physiological information 112 on the remote server 10 himself. In other words, the pet physiological information 112 may also include a consultation record or pathological information of the pet. Nevertheless, the consultation record or the pathological information may also be entered via the mobile carrier or the computer held by the veterinarian.

When the pet status 121 requires special attention, the remote server 10 can also filter the nearby suitable pet hospitals based on the physiological information 302 in the pet physiological information 112 and the medical information 113 to provide them to the owner for reference. The owner can then refer to the contact information in the medical information 113 for online consultations or medical visits, thereby reducing the information asymmetry between them.

In addition, the consultation records or the pathological information in the pet physiological information 112 may correspond to periods when the pet is in a poor condition. In this context, grading parameters for the pet status 121 can be changed based on the condition of the pet, such as resetting from the "caution" level to the "requires special attention" level by the owner or the veterinarian. It should be noted that this grading parameters includes the physiological information 302 and the environmental information 301. For example, during an illness, the frequency of sending the pet status 121 by the mobile carrier 20 may be increased or sent to more mobile carrier 20 holders. During follow-up visits, the aforementioned pet physiological information 112 can again be provided for reference by the veterinarian to determine the grading parameters for the pet status 121 in the future.

In this embodiment, the remote server 10 can also generate pet social information 123 based on the owner information 111 and/or the pet physiological information 112 so that owners in nearby areas can have opportunities to communicate. In addition, the remote server 10 can also generate the pet social information 123 specifically based on the activity information, emotional information, etc., from the physiological information 302, such as selecting the pets of the same breed, size, and activity level for friendly interactions between the owners and the pets.

The remote server 10 may also form the pet status 121 based on the specific physiological information 302, such as the activity information, the emotional information, and current location information of the wearable sensing device 30, to record social preferences and geographic preferences of the pet. For example, preferences for specific individuals or other pets, or preferences for specific veterinary hospitals or pet hotels.

Figure 2:
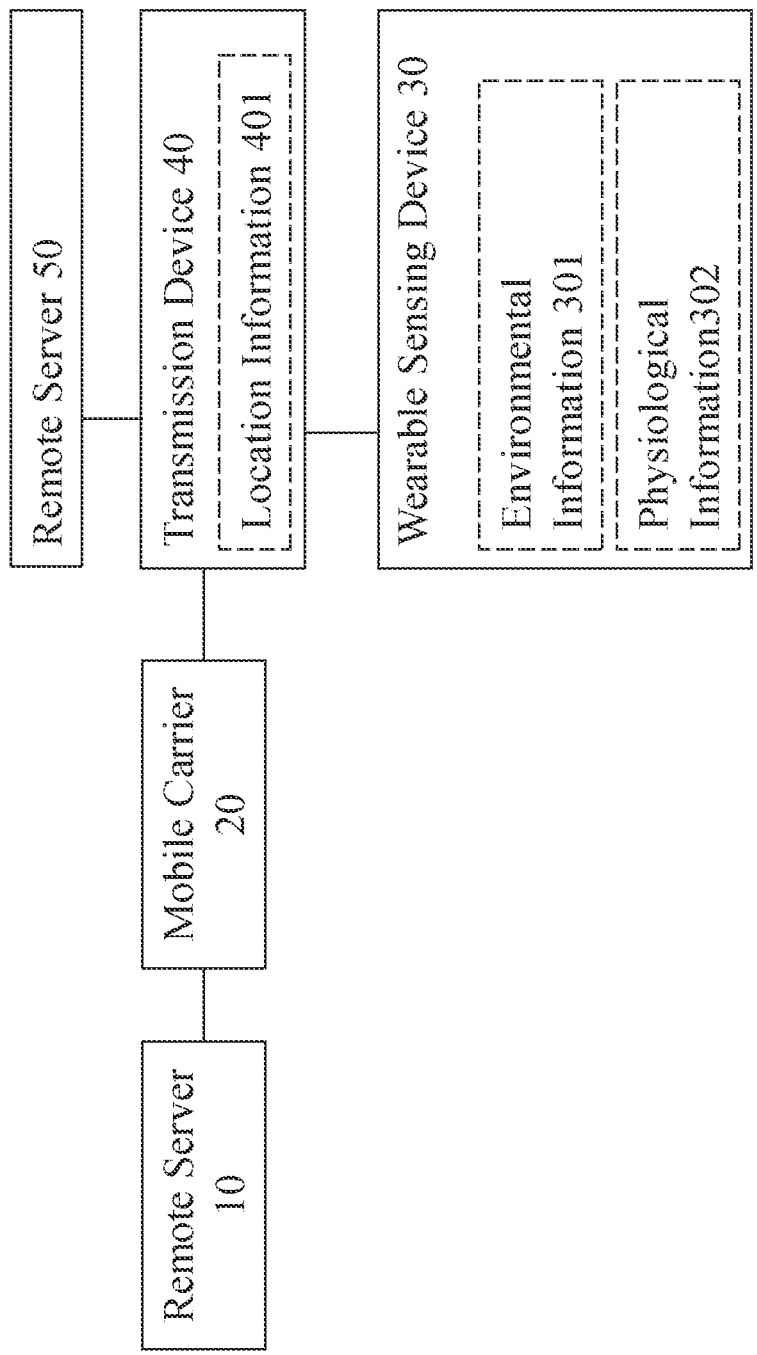
FIG. 2 is another schematic diagram of the pet health management system.

Reference is made to FIG. 2, which illustrates another schematic diagram of the pet health management system. The difference from the previous embodiment lies in the fact that the wearable sensing device 30 first wirelessly connects to a transmission device 40, and the transmission device 40 then wirelessly transmits the data acquired by the wearable sensing device 30 to the mobile carrier 20. Optionally, the transmission device 40 may also directly transmit the data acquired by the wearable sensing device 30 to another remote server 50. Thus, even if the connection between the mobile carrier 20 and the wearable sensing device 30 is disconnected, the environmental information 301 and the physiological information 302 of the pet can still be acquired in a timely manner.

The number of transmission devices 40 can be plural. In addition to being placed in the home, the transmission devices 40 may also be set with corresponding location information 401 and placed in locations such as pet hospitals or pet hotels, allowing owners, veterinarians, and caregivers to receive real-time information. The location information 401 of the transmission devices 40 can also serve as positioning information for the wearable sensing device 30, allowing the wearable sensing device 30 to extend battery longevity without having to build an internal positioning module.

What is claimed is:

1. A pet health management system comprising:
    a wearable sensing device that acquires environmental information and physiological information of a pet, and transmits the physiological information and the environmental information to a mobile carrier, the wearable sensing device including a microwave receiver for acquiring the physiological information; and
    a remote server that stores owner information and pet physiological information, receives the physiological information and the environmental information transmitted from the mobile carrier, updates the pet physiological information based on the environmental information and the physiological information, and generates and returns a pet status to the mobile carrier;
    wherein the pet status corresponds to one of multiple levels and the remote server is configured to reset the level corresponding to the pet status to match a care context and return the level to the mobile carrier;

wherein the remote server connects to the mobile carrier, the pet physiological information includes pathological information, the mobile carrier obtains the pathological information from the remote server, updates the pathological information, and returns the updated pathological information and a medical order to the remote server;

a resetting being executed by the remote server is such that grading parameters for the pet status corresponding to first level physiological information in one care context and grading parameters for the same pet status corresponding to second level physiological information in another care context are the same, and the resetting is performed based on the medical order.

2. The pet health management system according to claim 1, wherein the wearable sensing device is wirelessly connected to a transmission device that transmits the physiological information and the environmental information acquired by the wearable sensing device to the mobile carrier or another server.

3. The pet health management system according to claim 2, wherein the physiological information corresponds to at least one of heartbeat, respiration, steps, and blood oxygen, and the environmental information includes temperature and/or humidity.

4. The pet health management system according to claim 2, wherein the mobile carrier is used to input care information, and the remote server or the mobile carrier generates care reminder information based on the care information.

5. The pet health management system according to claim 2, wherein the remote server forms the pet status based on the physiological information and a location coordinate of the wearable sensing device.

6. The pet health management system according to claim 2, wherein the number of the transmission devices is plural and have different coordinates.

7. The pet health management system according to claim 1, wherein the remote server forms pet social information based on the owner information and/or the pet physiological information.

8. The pet health management system according to claim 1, wherein the pet status includes the environmental information and the physiological information, and corresponds to a monitoring context.

* * * * *